UNITED STATES PATENT OFFICE.

NATHANIEL A. BOYNTON, OF NEW YORK, N. Y.

IMPROVEMENT IN STOVE-PIPE DAMPERS.

Specification forming part of Letters Patent No. 116,675, dated July 4, 1871.

*To all whom it may concern:*

Be it known that I, NATHANIEL A. BOYNTON, of the city, county, and State of New York, have invented a new and useful Stove-Pipe Damper and Draught-Regulator, of which the following is a specification:

The invention consists: 1st, in an improved construction and combination of a stove-pipe damper and sleeve surrounding its shaft so as to afford a bearing extended on the outside to a sufficient distance horizontally to support the damper from one side only without obstructing its rotation. 2d, in the mode of applying a handle, made separately from the damper-shaft and secured thereon by a sleeve-joint, so that the handle may be less liable to become heated.

Figure 1:
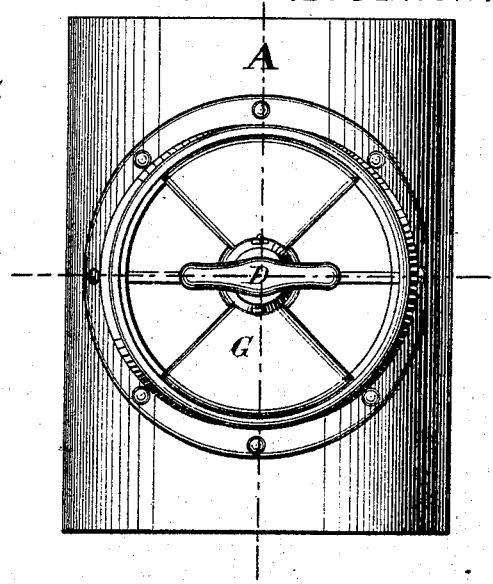
Figure 2:
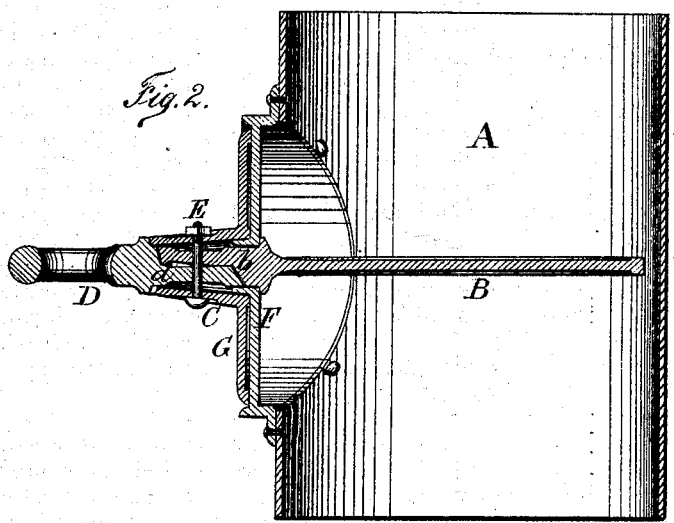
Figure 3:
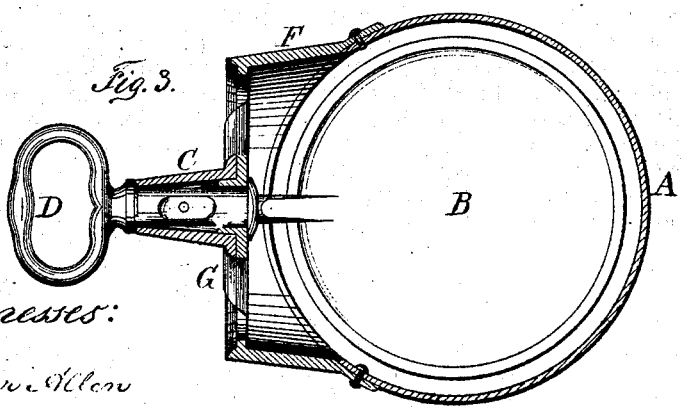

Figure 1 is a front view of a stove-pipe with a damper and register applied according to my invention. Fig. 2 is a vertical section thereof, showing the damper closed. Fig. 3 is a horizontal section of the same.

A represents a stove-pipe of common form. B is a damper, which may be cast in one piece with a shaft, $b$. The said shaft projects on one side only of the damper, and is tapered in thickness toward its end, and formed with a flat face adapted to fit a similar face on the shaft $d$ of the handle D. The external surfaces or peripheries of the combined shafts $b$ and $d$ are of approximately cylindrical form, tapering toward the outside and fitting within a sleeve or casing, C, which, being slipped upon them and secured by a transverse pin, E, will hold the parts firmly together and complete a secure bearing for the damper B, which is thereby supported in its required horizontal position within the pipe, and at the same time left free to be turned by means of the handle D. The stationary part of the register consists of a cast piece, F, formed with segmental apertures, and secured within a suitable cavity provided for it in the stove-pipe. The moving member of the register consists of a corresponding plate, G, formed with similar apertures, and cast in one piece with the sleeve C before referred to. The damper is preferably of a diameter less than that of the stove-pipe, so that, when in its horizontal position, it will nearly but not completely close the area of the pipe, but will leave an annular space around the periphery, as illustrated in Figs. 2 and 3.

From the above description it will appear that the apparatus, consisting of four simple castings, one of which has been riveted within the opening formed for it in the stove-pipe, can readily be put together, and when secured by the application of the single pin E all the parts will be firmly sustained in position without requiring any bearing for the damper on its side opposite to that at which the sleeve C is applied. While the damper is in its horizontal position the register G is open to allow the entrance of external air into the pipe; but when the damper is opened the register will be simultaneously closed, so as to cause an active draught through the stove-pipe. As the use of combined dampers and registers is well known, the operation of my invention will be clearly understood without a more extended description, and the superiority of my particular mode of constructing, applying, and combining the parts will be clearly manifest.

I claim as my invention—

1. The damper B, shaft $b$, and connected sleeve and plate C G, when constructed and combined, substantially as herein shown and described, to support the damper firmly in position while permitting its free rotation.

2. The combination of the handle D, divided shaft $d\ b$, and damper B, when applied, substantially as herein described, so as to retard the communication of heat to the handle D, as set forth.

NATHANIEL A. BOYNTON.

Witnesses:
OCTAVIUS KNIGHT,
H. C. ELLIOTT.

NATHANIEL A. BOYNTON.
STOVE PIPE DAMPER AND REGISTER.
OR DRAFT REGULATOR.

No. 116675

Patented Jul. 4 1871

Witnesses:
Walter Allen
H. B. Elliott

Inventor:
N. A. Boynton
By Knight Bros
Attorneys